M. WERNER.
ADJUSTABLE COOKING PAN.
APPLICATION FILED JAN. 31, 1916.
1,202,629.
Patented Oct. 24, 1916.
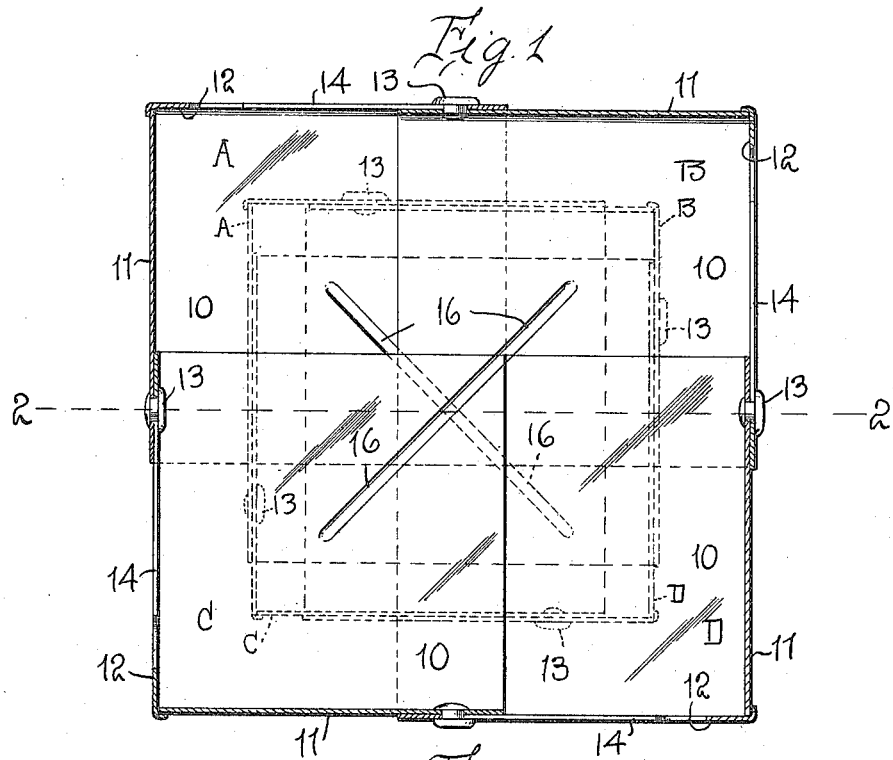
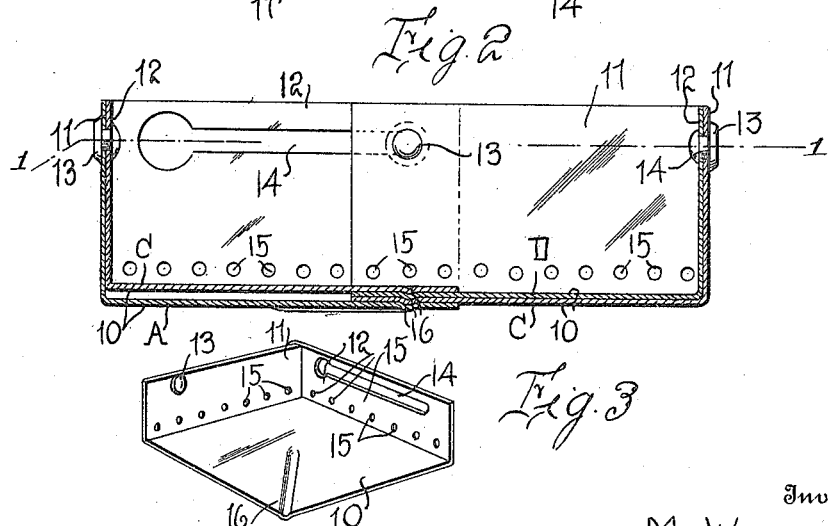
Inventor
M. WERNER
By Watson E. Coleman
Attorney

UNITED STATES PATENT OFFICE.

MINNIE WERNER, OF DAVENPORT, IOWA.

ADJUSTABLE COOKING-PAN.

1,202,629.   Specification of Letters Patent.   Patented Oct. 24, 1916.

Application filed January 31, 1916. Serial No. 75,358.

*To all whom it may concern:*

Be it known that I, Mrs. MINNIE WERNER, a citizen of the United States, residing at Davenport, in the county of Scott and State of Iowa, have invented certain new and useful Improvements in Adjustable Cooking-Pans, of which the following is a specification, reference being had to the accompanying drawings.

My invention relates to cooking utensils, and particularly to utensils which are used for roasting or baking, such as pans for this purpose.

The general object of my invention is the provision of a pan which is formed in sections, the several sections having means whereby they may be interlocked with each other whereby the sections may be taken apart and nested one within the other, thus to save space and permit ready transportation.

Another object of my invention is the provision of a pan formed in sections in which the sections are adjustably connected to each other so that the pan may be made larger or smaller or the shape of the pan may be changed to suit any exigencies of operation.

Still another object of the invention is to provide a pan formed of sections, each section being a duplicate of any other section, and each section having means whereby it may have adjustable interlocking engagement with an adjacent section.

Another object is to provide a pan so formed that it may be disposed in the bottom of a roasting pan wherein meats are being roasted or baked and the pan being provided with perforations whereby the liquid in the bottom of the roasting or baking pan may pass into the bottom of the auxiliary pan and into contact with vegetables or other dressing being cooked therein.

Other objects will appear in the course of the following description.

My invention is illustrated in the accompanying drawings, wherein:

Figure 1 is a horizontal sectional view of my improved pan on the line 1—1 of Fig. 2; Fig. 2 is a vertical section on the line 2—2 of Fig. 1; Fig. 3 is a perspective detail view of one of the sections of the pan.

Referring to these drawings, it will be seen that my improved pan consists of four sections, A, B, C and D. All of these sections are identical in form. Each section comprises a bottom 10, and a wall 11 extending upward from the bottom and a wall 12 also extending upward from the bottom and disposed at right angles to the wall 11. The bottom 10 and the walls 11 and 12 are formed integral. One of the walls, as for instance the wall 11, is formed with an inwardly projecting headed stud 13 while the other wall 12 is formed with a relatively elongated key-hole slot 14, the head of the slot being disposed adjacent the wall 11. The stud 13 and the slot 14 are disposed relatively near the upper edge of the section. The bottom 10 of each section is preferably rectangular in form.

When the sections are joined in the manner indicated in Fig. 1, they form a rectangular pan, either square or oblong as occasion may demand, the several sections being slidingly connected to each other by means of the studs 13 and the slots 14. It will be seen from the drawings that the sections C and D may be drawn outward relative to the sections A and B to thus increase the length of the pan, or that the sections B and D may be drawn outward relative to the sections A and C so as to increase the width of the pan and that the pan may be therefore adjusted so that it will either have a size only slightly larger than that of the bottom 10 of a section, or an area equal to nearly four times the size of each bottom 10, and that the size of the pan is adjustable within these limits. It will also be seen that the sections may be shifted so as to make the pan oblong in shape or square, as desired. Furthermore, when the sections are shifted fully inward the several studs 13 will register with the several heads of the key-hole slots 14 and under these circumstances the sections may be readily disengaged from each other. The sections may then be nested one inside the other for packing or storage. Preferably the walls 12 and 11 of each section are formed with a plurality of perforations 15 disposed near the bottom 10, and each bottom 10 is formed with a groove or depression 16 extending inward from the inner corner of the bottom toward the outer corner thereof.

This pan may be used for a variety of purposes. Thus it will be placed in the end of a roasting pan and vegetables or other dressing may be disposed within the adjustable pan, thereby separating the meats from the dressing but at the same time the perforations 15 permit the juices and liquor within which the meat is cooking to pass into the auxiliary pan. Under these circumstances the dressing or other material placed in the auxiliary pan will obtain the full flavor of the meat but the juices will not become too thick. My improved pan is also adapted to be used as a bread pan. This makes the pan particularly good for use in a bakery as it will do away with the necessity of using many different sizes of pans. The pan may also be used as a cake pan by placing oiled paper on the inside of the pan which will prevent the soft dough from running out of the holes 15 and the cake or bread may be easily removed by opening, that is, increasing the size of the pan by shifting the sections upon each other.

It will be obvious that the pan is extremely sanitary inasmuch as the sections may be closed upon each other and then disengaged leaving each section free to be thoroughly washed and cleansed. The construction is such that the sections may be readily formed from sheet metal at a minimum of expense.

Having described my invention, what I claim is:

1. A pan formed of a plurality of sections, each section having a square bottom, upwardly extending side walls disposed at right angles to each other, one of said side walls being formed with a slot and the other side wall with a stud engaging in the slot of an adjacent section whereby the sections may be adjusted upon each other to fit the shape and size of the pan.

2. A pan formed of a plurality of sections, each section having a square bottom and upwardly extending side walls disposed at right angles to each other and extending along two sides of the bottom, one of the side walls being formed with a key-hole slot the head of which is disposed adjacent the other side wall and said other side wall being formed with an outwardly projecting stud adapted to engage in the key-hole slot of the next adjacent section whereby said sections may be engaged or disengaged from each other, and when engaged are adjustably supported.

3. A pan formed of four sections, each section constituting a corner of the pan, each section having a bottom and two side walls at right angles to each other, the bottom and side walls of each section having sliding engagement with the bottom and one side wall of the adjacent section, and means connecting the side walls of the sections to each other for sliding adjustment, said means permitting the entire detachment of the sections from engagement with each other.

4. A pan formed of a plurality of sections, each of said sections having a square bottom and two side walls disposed at right angles to each other and extending up from two sides of the bottom, one of the walls being formed with a headed stud upon its inside face and the other wall having a key-hole slot, the head of said slot being disposed adjacent the first-named wall and the slot extending nearly the whole length of the side wall, the sections being arranged with their bottoms in overlapping relation and the stud of one section engaged in the key-hole slot of the next adjacent section, the side walls being formed adjacent the bottom with a longitudinally extending row of perforations.

In testimony whereof I hereunto affix my signature in the presence of two witnesses.

Mrs. MINNIE WERNER.

Witnesses:
H. F. Joseph,
Frank J. Len.

Copies of this patent may be obtained for five cents each, by addressing the "Commissioner of Patents, Washington, D. C."